(12) United States Patent
Kawaguchi et al.

(10) Patent No.: US 7,592,101 B2
(45) Date of Patent: Sep. 22, 2009

(54) NON-AQUEOUS ELECTROLYTE PRIMARY BATTERY

(75) Inventors: Shinichi Kawaguchi, Osaka (JP);
Yukihiro Gotanda, Osaka (JP);
Shinichiro Tahara, Osaka (JP)

(73) Assignee: Panasonic Corporation, Osaka (JP)

( * ) Notice: Subject to any disclaimer, the term of this patent is extended or adjusted under 35 U.S.C. 154(b) by 711 days.

(21) Appl. No.: 11/377,390

(22) Filed: Mar. 17, 2006

(65) Prior Publication Data

US 2006/0210884 A1 Sep. 21, 2006

(30) Foreign Application Priority Data

Mar. 17, 2005 (JP) .............................. 2005-076818

(51) Int. Cl.
*H01M 2/14* (2006.01)
*H01M 2/16* (2006.01)
*H01M 6/16* (2006.01)

(52) U.S. Cl. ...................... 429/248; 429/129; 429/246; 429/247; 429/249; 429/250; 429/231.95; 429/231.8; 429/324; 429/327; 429/329; 429/336; 429/337

(58) Field of Classification Search ........................ None
See application file for complete search history.

(56) References Cited

U.S. PATENT DOCUMENTS 5,580,684 A * 12/1996 Yokoyama et al. .......... 429/324
5,714,533 A * 2/1998 Hatakeyama et al. ....... 524/140
2003/0072996 A1* 4/2003 Roh ........................... 429/144
2005/0031947 A1* 2/2005 Yamada et al. ............. 429/162

FOREIGN PATENT DOCUMENTS

JP 05-036394 2/1993
JP 2000-133237 5/2000

* cited by examiner

*Primary Examiner*—Dah-Wei D Yuan
*Assistant Examiner*—Katherine Turner
(74) *Attorney, Agent, or Firm*—McDermott Will & Emery LLP

(57) ABSTRACT

A non-aqueous electrolyte primary battery including: a positive electrode including a fluorinated carbon; a negative electrode including a lithium metal; a non-aqueous electrolyte; and a separator, wherein the non-aqueous electrolyte includes a non-aqueous solvent and a solute dissolved therein, the non-aqueous solvent including γ-butyrolactone, and the separator includes a microporous membrane onto which a phosphoric acid ester is provided, the phosphoric acid ester being represented by the formula (1):

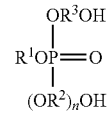

where $R^1$ is an alkyl group, $R^2$ and $R^3$ are each independently an alkylene group, and n is an integer.

2 Claims, 3 Drawing Sheets

F I G. 3
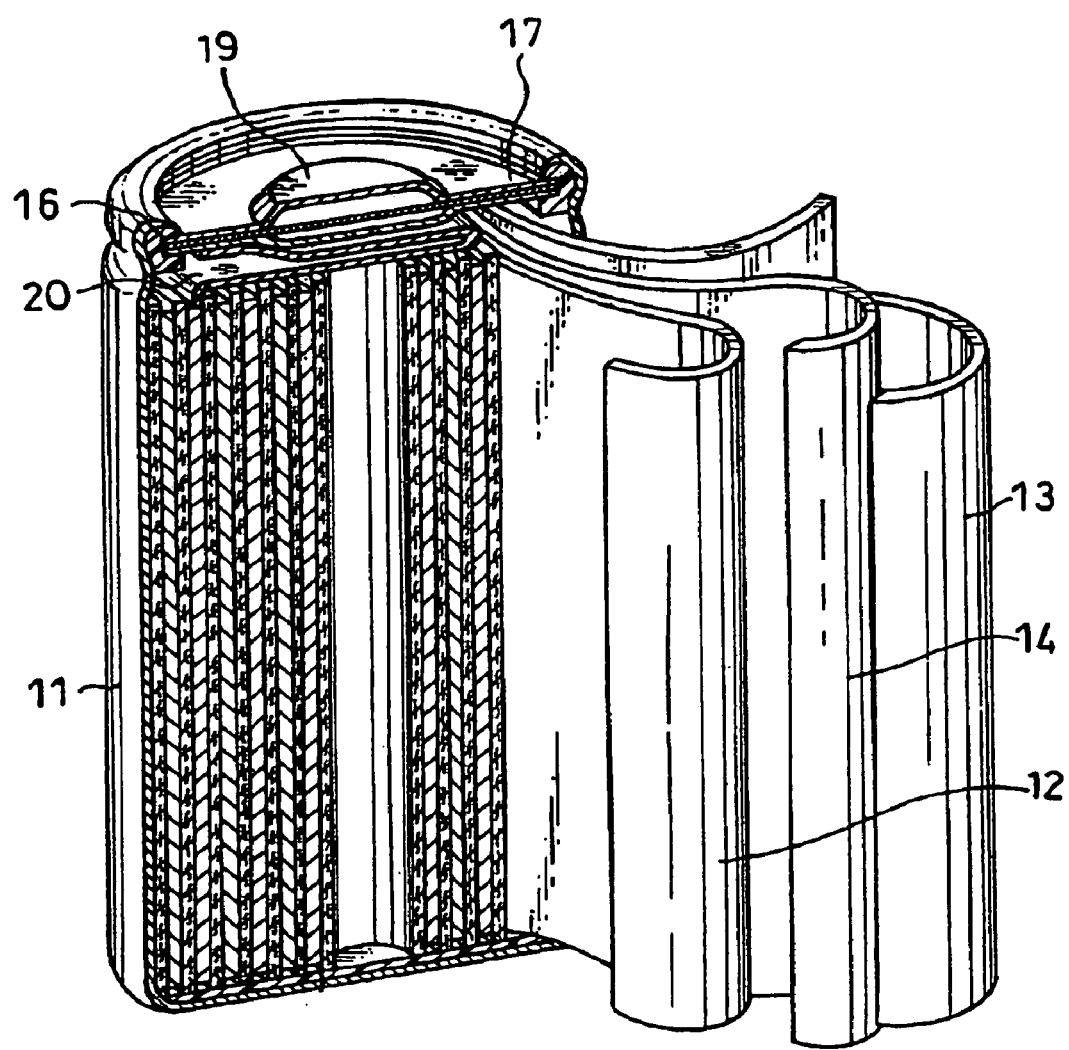

NON-AQUEOUS ELECTROLYTE PRIMARY BATTERY

FIELD OF THE INVENTION

The present invention relates to a non-aqueous electrolyte primary battery that includes a positive electrode including a fluorinated carbon, a negative electrode including a lithium metal, a non-aqueous electrolyte comprising a non-aqueous solvent in which a solute is dissolved, and a separator, wherein the non-aqueous solvent includes γ-butyrolactone.

BACKGROUND OF THE INVENTION

Non-aqueous electrolyte primary batteries include a positive electrode including a fluorinated carbon, a negative electrode including a lithium metal, a non-aqueous electrolyte including a non-aqueous solvent in which a solute is dissolved, and a separator. Such non-aqueous electrolyte primary batteries have a high energy density.

Here, when the non-aqueous solvent includes γ-butyrolactone, batteries can maintain stable characteristics for a long period. For this reason, batteries that include a non-aqueous solvent including γ-butyrolactone are being used as the main power sources for equipment that is used over a long period (e.g., an intelligent gas meter), or back-up power sources (e.g., a memory back-up power source).

Moreover, γ-butyrolactone has a high boiling point. Therefore, batteries that include a non-aqueous solvent including γ-butyrolactone exhibit stable characteristics even under an environment with a high temperature of 100° C. or above. Non-aqueous electrolyte primary batteries having excellent high-temperature characteristics have garnered attention, for example, as the power sources for tire air pressure sensors.

However, a non-aqueous electrolyte including γ-butyrolactone has a high viscosity. Accordingly, the efficiency of the impregnating operation of electrodes or a separator with the non-aqueous electrolyte is reduced, reducing the productivity of batteries. Furthermore, when the non-aqueous electrolyte has a high viscosity, the electrolyte retention of a separator is reduced, so that it becomes difficult to realize stable discharge.

Therefore, in order to improve the productivity of batteries, a nonwoven fabric having excellent electrolyte retention is used for separators.

Further, in order to improve the electrolyte retention of a separator, it is proposed to provide hydrophilic fibers on the surface of the separator (Japanese Laid-Open Patent Publication No. Hei 5-36394). In addition, it is proposed to add a surfactant to resin fibers constituting a nonwoven fabric (Japanese Laid-Open Patent Publication No. 2000-133237).

For the fibers constituting the nonwoven fabric, polypropylene, polyphenylene sulfide, polybutylene terephthalate or the like is used.

BRIEF SUMMARY OF THE INVENTION

A separator comprising a nonwoven fabric has a large thickness, which is usually 0.05 mm to 0.1 mm. Accordingly, the separator occupies a large volume in a battery, inhibiting the increase of the battery capacity.

Therefore, the present invention relates to a non-aqueous electrolyte primary battery including: a positive electrode including a fluorinated carbon; a negative electrode including a lithium metal; a non-aqueous electrolyte; and a separator, wherein the non-aqueous electrolyte includes a non-aqueous solvent in which a solute is dissolved, the non-aqueous solvent includes γ-butyrolactone, the separator includes a microporous membrane onto which a phosphoric acid ester is provided, and the phosphoric acid ester is represented by the formula (1):

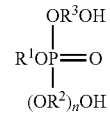

where $R^1$ is an alkyl group, $R^2$ and $R^3$ are each independently an alkylene group, and n is an integer.

A microporous membrane can be made thinner than a nonwoven fabric. Therefore, using a microporous membrane reduces the thickness of a separator, thus decreasing the volume occupied by the separator in the battery. Moreover, applying a phosphoric acid ester represented by the formula (1) onto the microporous membrane improves the efficiency of the impregnating operation of electrodes or a separator with a non-aqueous electrolyte. Accordingly, even when using a microporous membrane, it is possible to prevent a reduction in the productivity of batteries. Furthermore, a microporous membrane on which a phosphoric acid ester is applied has good affinity for a non-aqueous electrolyte, and therefore can realize stable discharge. That is, with the present invention, it is possible to provide a non-aqueous electrolyte primary battery having a high capacity and excellent discharge performance with high efficiency.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 3 is a vertical cross-sectional view showing a cylindrical non-aqueous electrolyte primary battery according to Example 2 of the present invention.

DETAILED DESCRIPTION OF THE INVENTION

Figure 1:
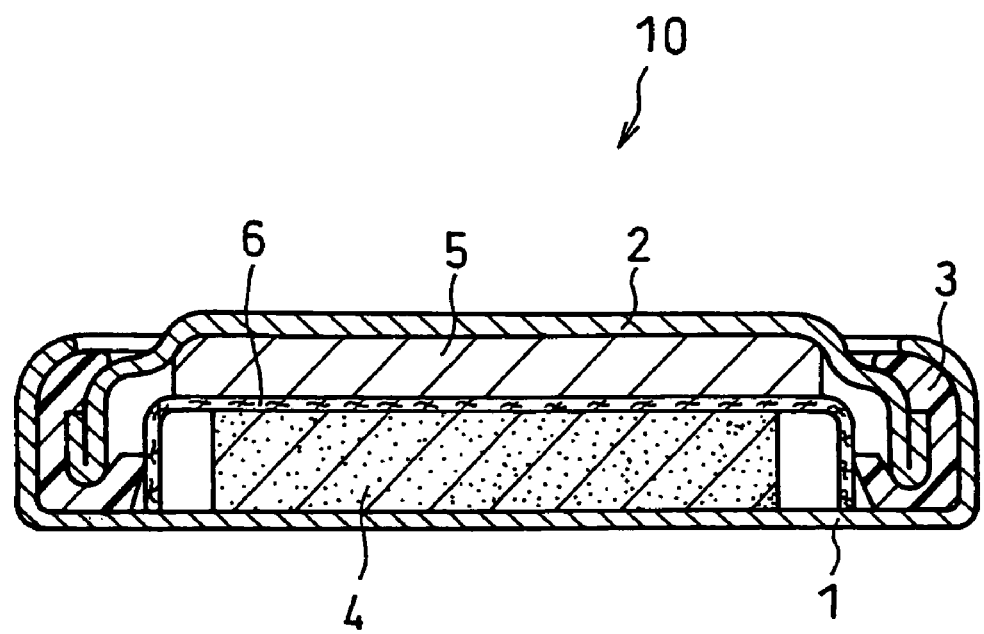
FIG. 1 is a vertical cross-sectional view showing a coin-shaped non-aqueous electrolyte primary battery according to Example 1 of the present invention.

A non-aqueous electrolyte primary battery of the present invention includes a positive electrode, a negative electrode, a non-aqueous electrolyte and a separator. While there is no particular limitation with respect to the shape of the battery, the battery is generally coin-shaped, cylindrical or square.

The coin-shaped battery includes a positive electrode case and a negative electrode case. A disc-shaped positive electrode is housed in the positive electrode case, and a disc-shaped negative electrode is housed in the negative electrode case. A separator is interposed between the positive electrode and the negative electrode.

The cylindrical or square battery includes a battery case and a sealing plate. An electrode group is housed in the battery case. The electrode group is formed of a band-shaped positive electrode and a band-shaped negative electrode, which are wound with a separator disposed between the electrodes.

The positive electrode includes a fluorinated carbon. The fluorinated carbon can be obtained by a reaction between a carbon material and a fluorine gas at a temperature of about 250 to about 650° C., for example. As the carbon material, it is possible to use, for example, coke or graphite. Depending on the conditions under which the carbon material is fluorinated, $(CF_x)_n$ ($0.5 \leq x \leq 1$), $(C_2F)_n$ or a mixture thereof can be obtained.

There is no particular limitation with respect to the shape, particle size and the like of the fluorinated carbon. However, it is preferable to use needle coke as the carbon material. A needle coke that has been fluorinated at about 600° C. exhibits excellent discharge stability.

The positive electrode may include, for example, a binder and a conductive auxiliary agent that are publicly known. As the binder, it is possible to use, for example, a fluorocarbon resin such as polytetrafluoroethylene (PTFE) or polyvinylidene fluoride (PVDF). As the conductive auxiliary agent, it is possible to use, for example, graphite or acetylene black.

In the case of the cylindrical or square battery, a positive electrode material mixture including a fluorinated carbon is filled in or applied on a core member to produce a positive electrode. The core member carrying the positive electrode material mixture may be rolled. As the core member, it is possible to use, for example, a publicly known expanded metal formed of titanium, stainless steel or the like, or an aluminum foil.

The negative electrode includes a lithium metal. The lithium metal may be an alloy containing a small amount of an additional metal element. The lithium metal may contain aluminum, silicon, tin or nickel, for example.

The non-aqueous electrolyte may be γ-butyrolactone in which a solute is dissolved. However, the non-aqueous electrolyte may include a small amount (e.g., not more than 5 wt % of the non-aqueous solvent as a whole) of a solvent other than γ-butyrolactone.

As the solute, it is possible to use various lithium salts. Examples of the lithium salts include, but not limited to, $LiPF_6$, $LiBF_4$, $LiClO_4$, $LiCF_3SO_3$, $LiN(CF_3SO_2)_2$ and $LiN(C_2F_5SO_2)_2$. The solute may be used alone or in combination of two or more of them. The concentration of the solute in the non-aqueous electrolyte is preferably 0.8 to 1.2 mol/L, for example.

The separator may be a microporous membrane onto which a phosphoric acid ester is applied. The microporous membrane can be obtained by forming a resin or a resin composition into a porous sheet. There is no particular limitation with respect to the method for forming a sheet, and it is possible to perform uniaxial drawing or biaxial drawing. There is also no particular limitation with respect to the method for forming micropores. A resin containing a pore-producing agent (e.g., a plasticizer) is formed into a sheet, for example, and the obtained sheet is washed to remove the pore-producing agent. Thereby, a porous sheet can be obtained. There is no particular limitation with respect to, for example, the porosity, piercing strength and air permeability of the microporous membrane.

As a raw material resin for the microporous membrane, it is preferable to use, for example, a polyolefin resin such as polypropylene or polyethylene.

The phosphoric acid ester applied onto the microporous membrane is represented by the formula (1):

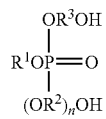

where $R^1$ is an alkyl group, $R^2$ and $R^3$ are each independently an alkylene group, and n is an integer.

The phosphoric acid ester represented by the formula (1) is a nonionic surfactant, and does not include metal ion. Therefore, it is considered that the use of this phosphoric acid ester in the non-aqueous electrolyte primary battery does not have any particular influence on the battery characteristics.

$R^1$ is an alkyl group having one or more carbon atoms. $R^2$ is an alkylene group having one or more carbon atoms, and $R^3$ is also an alkylene group having one or more carbon atoms. It is considered that n is preferably $5 \leq n \leq 7$.

Among phosphoric acid esters represented by the formula (1), in terms of the stability of properties thereof, it is particularly preferable to use a phosphoric acid ester represented by the formula (2):

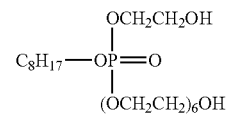

The phosphoric acid ester represented by the formula (1) may be mixed with a solvent such as water to obtain a solution having a viscosity suitable for application, and applied onto the microporous membrane as the solution. While the phosphoric acid ester may be applied onto both sides of the microporous membrane, it may simply be applied onto one side.

The amount of the phosphoric acid ester represented by the formula (1) is preferably 10 to 20%, more preferably 14 to 17% with respect to the weight of the microporous membrane.

Example 1

(i) Production of Positive Electrode

A fluorinated carbon was obtained by fluorinating needle coke. The fluorinated carbon, acetylene black serving as a conductive auxiliary agent and polytetrafluoroethylene (PTFE) serving as a binder were mixed at a weight ratio of 80:10:10 to prepare a positive electrode material mixture paste. PTFE was used in the form of an aqueous dispersion.

The obtained positive electrode material mixture paste was applied onto an expended metal made of stainless steel (SUS 444). Thereafter, the expanded metal carrying the positive electrode material mixture was rolled to have a thickness of 0.35 mm, obtaining a positive electrode plate. Then, the positive electrode plate was punched into a disc having a diameter of 15 mm, thereby obtaining a positive electrode. The obtained positive electrode was dried at 120° C. for 8 hours.

(ii) Production of Negative Electrode

A lithium metal foil having a thickness of 0.2 mm was punched into a disc having a diameter of 14 mm, thus obtaining a negative electrode.

(iii) Preparation of Non-Aqueous Electrolyte

LiBF$_4$ serving as a solute was dissolved at a concentration of 1 mol/L in γ-butyrolactone serving as a solvent to give a non-aqueous electrolyte.

(iv) Preparation of Separator

An aqueous solution containing 16 wt % of the phosphoric acid ester represented by the formula (2) was prepared. The obtained aqueous solution was applied onto one side of a microporous membrane composed of polypropylene having a thickness of 0.025 mm (Flat Sheet Membrane (trade name) manufactured by Celgard K.K.). Thereafter, the microporous membrane was dried at room temperature for 24 hours. The amount of the phosphoric acid ester applied was 15% with respect to the weight of the microporous membrane. Then, the microporous membrane onto which the phosphoric acid ester was applied was punched into a disc having a diameter of 16 mm, thus obtaining a separator.

(v) Fabrication of Coin-Shaped Non-Aqueous Electrolyte Primary Battery

A coin-shaped battery 10 having an outer diameter of 20 mm and a height of 1.6 mm (Battery A) as shown in FIG. 1 was fabricated using the above-described positive electrode, negative electrode, non-aqueous electrolyte and separator.

A polypropylene gasket 3 was disposed at the periphery of a negative electrode case 2. A negative electrode 5 was attached by pressure to the inner surface of the negative electrode case 2. A separator 6 was disposed such that it covered the upper surface of the negative electrode 5. Thereafter, the non-aqueous electrolyte was injected into the negative electrode case 2 over the separator 6. Then, a positive electrode 4 was disposed such that it faced the negative electrode 5 via the separator 6. The opening of the negative electrode case 2 was sealed with a positive electrode case 1, thus completing Battery A.

Comparative Example 1

Battery B was fabricated in the same manner as Example 1, except that the aqueous solution of the phosphoric acid ester was not applied onto the microporous membrane in the preparation of the separator.

[Evaluation of Coin-Shaped Batteries]

The thus produced coin-shaped Batteries A and B were discharged with a discharge resistance of 10 kΩ, and their discharge characteristics were determined. The discharge curves of Batteries A and B are shown in FIG. 2.

Figure 2:
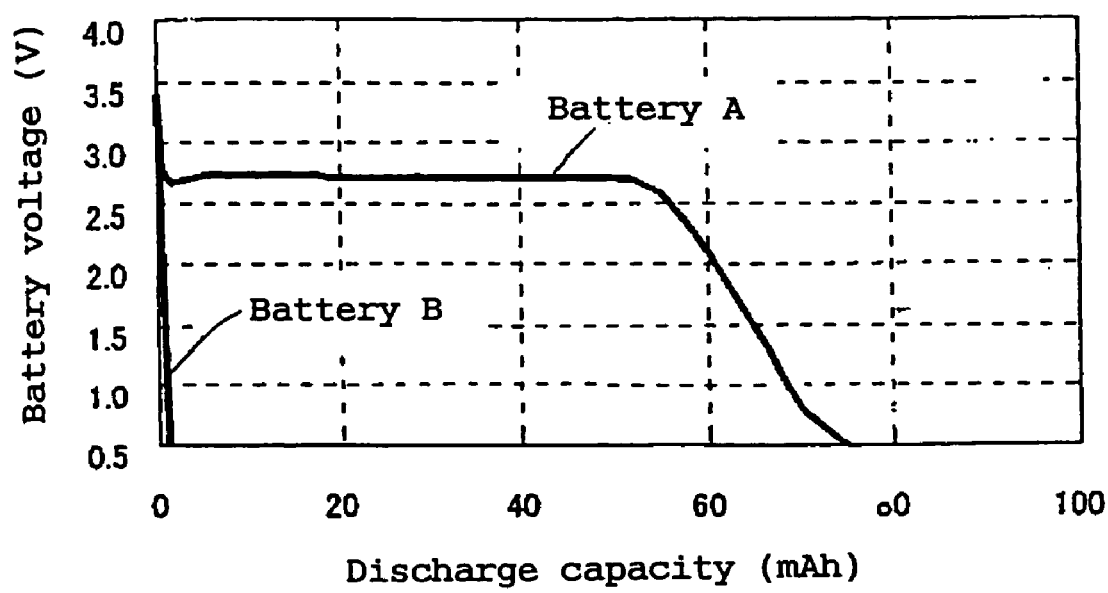
FIG. 2 is a graph for showing a discharge curve of a battery according to Example 1.

From FIG. 2, it is seen that Battery A of the example discharged normally. On the other hand, Battery B of the comparative example could not discharge normally. This relates to the fact that the phosphoric acid ester serving as a surfactant was not applied onto the microporous membrane. That is, it is considered that the separator of Battery B had insufficient non-aqueous electrolyte retention, so that Battery B could not function as a battery.

Example 2

(i) Production of Positive Electrode

A positive electrode plate having a thickness of 0.35 mm was produced in the same manner as Example 1, and the positive electrode plate was cut into a band having a width of 23 mm and a length of 190 mm, thus obtaining a positive electrode. A positive electrode current collecting lead made of SUS 444 was welded to the positive electrode. The obtained positive electrode was dried at 120° C. for 8 hours.

(ii) Production of Negative Electrode

A lithium metal foil having a thickness of 0.2 mm was cut into a band having a width of 21 mm and a length of 210 mm, thus obtaining a negative electrode. A negative electrode current collecting lead made of nickel was bonded to the negative electrode.

(iii) Preparation of Non-Aqueous Electrolyte

LiBF$_4$ serving as a solute was dissolved at a concentration of 1 mol/L in γ-butyrolactone serving as a solvent to give a non-aqueous electrolyte.

(iv) Preparation of Separator

An aqueous solution containing 16 wt % of the phosphoric acid ester represented by the formula (2) was prepared. The obtained aqueous solution was applied onto one side of a microporous membrane composed of polypropylene having a thickness of 0.025 mm (Flat Sheet Membrane (trade name) manufactured by Celgard K.K.). Thereafter, the microporous membrane was dried at room temperature for 24 hours. The amount of the phosphoric acid ester applied was 15% with respect to the weight of the microporous membrane. Then, the microporous membrane onto which the phosphoric acid ester was applied was punched into a band having a width of 26 mm and a length of 440 mm, thus obtaining a separator.

(v) Fabrication of Cylindrical Non-Aqueous Electrolyte Primary Battery

A cylindrical battery having an outer diameter of 17 mm and a height of 33.5 mm (Battery C) as shown in FIG. 3 was fabricated using the above-described positive electrode, negative electrode, non-aqueous electrolyte and separator.

A positive electrode 12 and a negative electrode 13 were spirally wound with a separator 14 interposed between them, producing an electrode group. Insulating plates (not shown) were disposed at the top and the bottom of the electrode group, and the electrode group was housed in a battery case 11. Thereafter, a negative electrode current collecting lead (not shown) was welded to the inner bottom surface of the battery case 11. A positive electrode current collecting lead 20 was welded to the inner surface of a sealing plate 17 having a positive electrode terminal 19. Then, the non-aqueous electrolyte was injected into the battery case 11. At this time, the injection of the non-aqueous electrolyte was performed smoothly due to the effect of the phosphoric acid ester. Then, the opening end of the battery case 11 was clamped to a gasket 16 disposed at the periphery of the sealing plate 17 to seal the battery case, thus completing Battery C.

Comparative Example 2

Battery D was fabricated in the same manner as Example 2, except that a conventional nonwoven fabric composed of polypropylene having a thickness of 0.5 mm (manufactured by TAPYRUS CO., LTD.) was used in place of the microporous membrane onto which the phosphoric acid ester was applied. However, in order to house the electrode group in a battery case having the same size as that of Example 2, the length of the positive electrode was changed to 170 mm, and the thickness and the length of the negative electrode were changed to 0.35 mm and 190 mm, respectively.

[Evaluation of Cylindrical Batteries]

The thus produced cylindrical Batteries C and D were discharged with a discharge resistance of 1 kΩ until the voltages of the batteries reached 2.0 V, and their discharge capacities were determined. The results are shown in Table 1.

TABLE 1

| Battery | Discharge capacity (mAh) |
| --- | --- |
| Battery C | 1735 |
| Battery D | 1193 |

As is clearly seen from Table 1, Battery C of the example had a discharge capacity significantly higher than that of Battery D of the comparative example, which used a nonwoven fabric. This result relates to the fact that the microporous membrane onto which the phosphoric acid ester was applied had good affinity for the non-aqueous electrolyte and allowed stable discharge. Further, the decrease in the volume occupied by the separator (the increase in the volume occupied by the positive electrode and the negative electrode) in the battery also contributed to the increase in the discharge capacity.

As described above, a non-aqueous electrolyte primary battery according to the present invention has a high capacity and excellent discharge performance, so that it has a very high industrial importance.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte primary battery comprising: a positive electrode including a fluorinated carbon; a negative electrode including a lithium metal; a non-aqueous electrolyte; and a separator,
wherein said non-aqueous electrolyte comprises a non-aqueous solvent and a solute dissolved therein, said non-aqueous solvent comprising γ-butyrolactone, and
said separator comprises a microporous membrane onto which a phosphoric acid ester is provided, said phosphoric acid ester being represented by the formula (1):

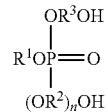

where $R_1$ is an alkyl group, $R_2$ and $R_3$ are each independently an alkylene group, and n is an integer greater than zero.

2. The non-aqueous electrolyte primary battery in accordance with claim 1,
wherein said phosphoric acid ester is represented by the formula (2):

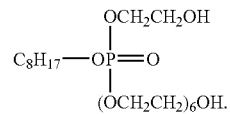

* * * * *